United States Patent
Fister et al.

(10) Patent No.: US 9,176,921 B2
(45) Date of Patent: *Nov. 3, 2015

(54) DYNAMIC ADDRESS CHANGE OPTIMIZATIONS

(71) Applicant: Lexmark International, Inc., Lexington, KY (US)

(72) Inventors: Zachary Nathan Fister, Lexington, KY (US); Gregory Scott Woods, Lexington, KY (US)

(73) Assignee: Lexmark International, Inc. KY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/456,012

(22) Filed: Aug. 11, 2014

(65) Prior Publication Data

US 2014/0351469 A1 Nov. 27, 2014

Related U.S. Application Data

(63) Continuation of application No. 14/047,671, filed on Oct. 7, 2013, now Pat. No. 8,850,079, which is a continuation of application No. 13/218,658, filed on Aug. 26, 2011, now Pat. No. 8,621,116.

(51) Int. Cl.
| | | |
|---|---|---|
| *G06F 13/38* | (2006.01) | |
| *G06F 13/42* | (2006.01) | |
| *G06F 12/06* | (2006.01) | |
| *G06F 12/14* | (2006.01) | |
| *G06F 13/364* | (2006.01) | |

(52) U.S. Cl.
CPC ........ *G06F 13/4295* (2013.01); *G06F 12/0661* (2013.01); *G06F 12/1433* (2013.01); *G06F 13/364* (2013.01); *G06F 13/38* (2013.01)

(58) Field of Classification Search
CPC .. G06F 13/38; G06F 12/1433; G06F 12/0661
USPC ...................... 710/8–10, 15, 16, 104; 399/24
See application file for complete search history.

(56) References Cited

U.S. PATENT DOCUMENTS

| | | | |
|---|---|---|---|
| 5,636,342 A * | 6/1997 | Jeffries | 714/48 |
| 5,708,831 A * | 1/1998 | Schon | 709/245 |
| 6,629,172 B1 * | 9/2003 | Andersson et al. | 710/104 |
| 6,745,270 B1 * | 6/2004 | Barenys et al. | 710/104 |
| 6,751,682 B1 * | 6/2004 | Stirling | 710/9 |
| 6,823,400 B2 * | 11/2004 | Namba | 710/9 |
| 7,085,863 B2 * | 8/2006 | Barenys et al. | 710/104 |
| 7,587,539 B2 * | 9/2009 | Picard et al. | 710/104 |
| 8,205,017 B2 * | 6/2012 | Parr et al. | 710/9 |
| 8,225,021 B2 * | 7/2012 | Adkins et al. | 710/110 |
| 8,386,657 B2 * | 2/2013 | Adkins et al. | 710/9 |
| 8,621,116 B2 * | 12/2013 | Fister et al. | 710/9 |
| 8,850,079 B2 * | 9/2014 | Fister et al. | 710/9 |
| 2006/0259673 A1 * | 11/2006 | Bancel et al. | 710/110 |
| 2007/0083491 A1 * | 4/2007 | Walmsley et al. | 707/3 |
| 2007/0236726 A1 * | 10/2007 | Robb et al. | 358/1.15 |
| 2008/0147941 A1 * | 6/2008 | Deshpande et al. | 710/110 |
| 2008/0186367 A1 * | 8/2008 | Adkins et al. | 347/86 |
| 2008/0301344 A1 * | 12/2008 | Hsieh | 710/110 |
| 2009/0070506 A1 * | 3/2009 | Furtner | 710/110 |

* cited by examiner

*Primary Examiner* — Glenn A Auve

(57) ABSTRACT

A method of setting an address of a component that includes determining a characterization value associated with a consumable, calculating a number of address change operations based upon the characterization value, and setting a last address generated from the number of address change operations as the new address of the component, wherein the characterization value is determined based upon a usage of the consumable.

21 Claims, 6 Drawing Sheets

DYNAMIC ADDRESS CHANGE OPTIMIZATIONS

CROSS REFERENCE TO RELATED APPLICATIONS

This application is related to U.S. patent application Ser. No. 12/474,052, filed on May 28, 2009, entitled, "Dynamic Address Change for Slave Devices on a Shared Bus," and assigned to the assignee of the present application.

Pursuant to 37 C.F.R. §1.78, this application is a continuation application and claims the benefit of the earlier filing date of application Ser. No. 14/047,671, filed Oct. 7, 2013, entitled "Dynamic Address Change Optimizations," which itself is a continuation of application Ser. No. 13/218,658, filed Aug. 26, 2011, also entitled "Dynamic Address Change Optimizations."

STATEMENT REGARDING FEDERALLY SPONSORED RESEARCH OR DEVELOPMENT

None.

REFERENCE TO SEQUENTIAL LISTING, ETC.

None.

BACKGROUND

1. Technical Field

The present disclosure generally relates to addressing schemes, and, more particularly, to dynamically changing addresses of components in an imaging device to provide enhanced security.

2. Description of the Related Art

A shared bus system is typically one of the simplest ways to connect multiple components. In order to prevent multiple components from transmitting data at the same time, shared bus systems normally use a bus master to control access to the shared bus resource. A well known protocol for providing orderly data communications between a bus master and components connected to a shared bus resource is the Inter-Integrated Circuit ($I^2C$) protocol. Each component is uniquely identified with an address. When the bus master initiates communications with a specific component, the address of the component is transmitted with a command on the shared bus during the initiation of the communication. While all of the components connected to the shared bus receive the command and the address from the bus master, only the component with the matching address responds to the command and sends back an acknowledgment to the bus master.

The security of communication systems utilizing the $I^2C$ communication protocols may be compromised. For example, if an authorized component were to be unplugged from the shared bus, the unauthorized component may be plugged in and programmed or wired to automatically assume the address of the authorized component that was unplugged. All that is needed by the unauthorized component to be connected to the shared bus resource is an active valid address that is available in the system. When this occurs and the bus master transmits that active address on the bus, the unauthorized component may communicate with and respond to the bus master without the bus master being aware of the unauthorized communications. However, this unauthorized activity may be thwarted by periodically changing the addresses of the components.

Existing methods that provide enhanced security employ dynamic address change operations. In such methods, the bus master periodically requests an authorized component to change its address to increase the difficulty for an unauthorized component to communicate with the bus master. This is accomplished by the bus master transmitting an address change command to the component without transmitting a new address and without the component transmitting its new address to the bus master, and the bus master running the same address change algorithm as the component to predict the new address in order to maintain address synchronization. In this manner, transmission of a new address for the component through the shared bus resource is avoided, and an attacker device sniffing traffic on the shared bus may be prevented from learning the new address.

There are, however, limitations to this solution that make it vulnerable to other forms of attack. For example, authorized components may need to reset their respective addresses to a default address after installation or during power-up. If authorized components utilize pseudorandom address generators, the generated pseudorandom sequences of addresses may be deterministic and reproducible such that the same series of addresses is generated after every instance of a reset or power-up. As a result, when authorized components have an invariable starting address, i.e. the default address, an attacker device may easily learn the progression of addresses of the authorized component. An unauthorized component may then be installed to replace the authorized component and act as a clone which can correctly respond with the same series of addresses as the authorized component.

Accordingly, there is a need to further enhance security by setting the address of an authorized component to a variable address on reset in order to prevent recurring series of to address changes after every reset and to keep an unauthorized component using a copied set of address changes from communicating with the bus master and acting as a clone of an authorized component.

SUMMARY

Embodiments of the present disclosure provide methods that may be implemented in an imaging device to thwart the use of unauthorized components as replacements for authorized components. According to example embodiments, a number of address change operations may be performed by a component after installation and/or on power-up. The number of address change operations may be calculated based upon a characterization value associated with a consumable such that the number of address change operations is dependent upon a usage of the consumable.

In one example embodiment, a controller may determine the characterization value associated with a consumable and calculate the number of address changes based upon the characterization value. The controller may then instruct a bus master to send a number of address change commands equal to the calculated number of address changes to the component. The component may receive the address change commands from the bus master and change its address a number of times equal to the number of address change commands using an address change algorithm. The component may then set a last address generated by the series of address change operations as its own address. To maintain address synchronization, the bus master may perform the same address change algorithm as the component and set the last address of the component as the new address in its record. The process may be started at every instance when power is first supplied to the component or upon reset of the component.

In one aspect, the characterization value may represent the actual number of address change operations. In another aspect, the number of address change operations may be randomly selected from a range of values defined by the characterization value.

Other embodiments, objects, features and advantages of the disclosure will become apparent to those skilled in the art from the detailed description, the accompanying drawings and the appended claims.

BRIEF DESCRIPTION OF THE DRAWINGS

The above-mentioned and other features and advantages of the present disclosure, and the manner of attaining them, will become more apparent and will be better understood by reference to the following description of example embodiments taken in conjunction with the accompanying drawings. Like reference numerals are used to indicate the same element throughout the specification.

DETAILED DESCRIPTION OF THE DRAWINGS

Figure 1:
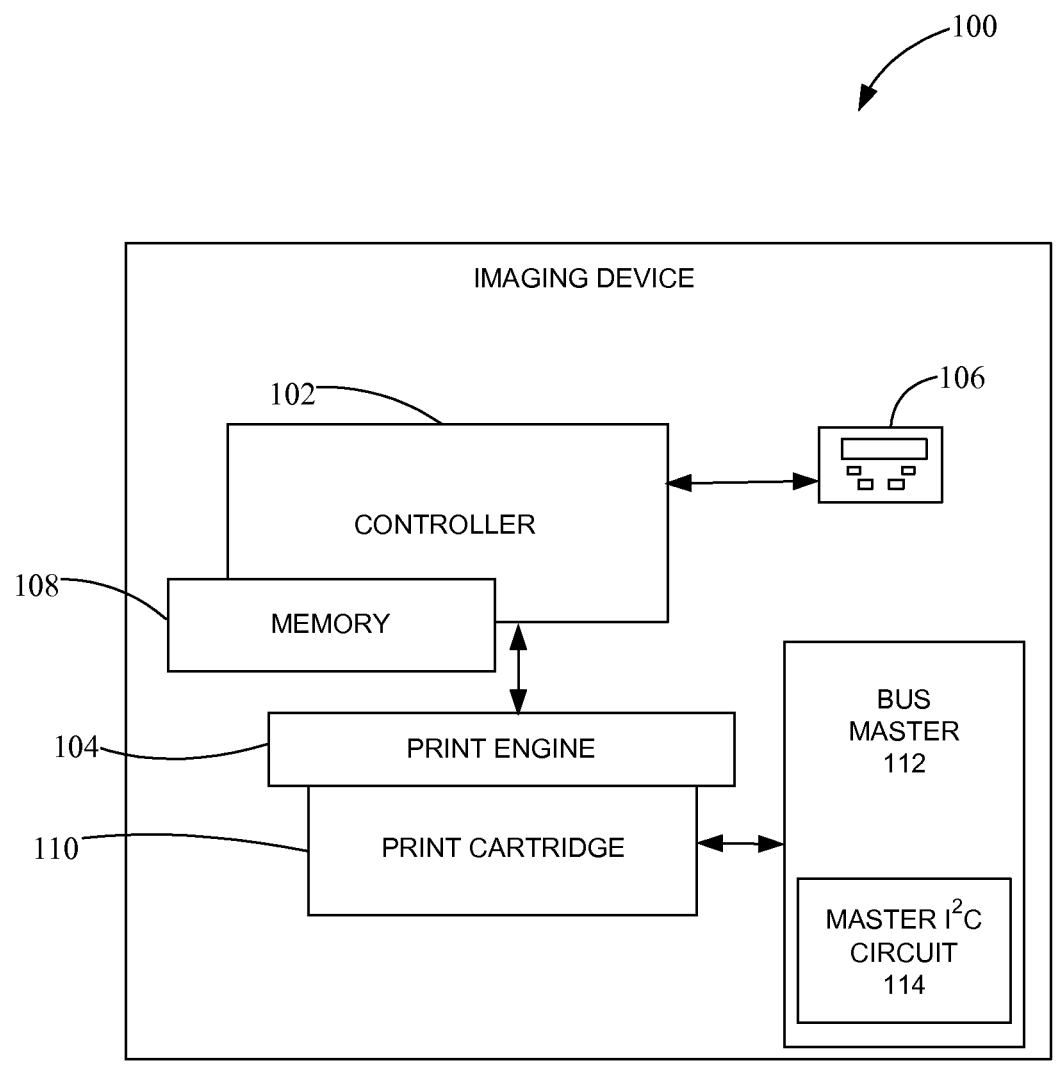
FIG. 1 is a block diagram depicting an imaging device.

The following description and drawings illustrate example embodiments sufficiently to enable those skilled in the art to practice the present disclosure. It is to be understood that the disclosure is not limited to the details of construction and the arrangement of components set forth in the following description or illustrated in the drawings. The disclosure is capable of other embodiments and of being practiced or of being carried out in various ways. For example, other embodiments may incorporate structural, chronological, electrical, process, and other changes. Examples merely typify possible variations. Individual components and functions are optional unless explicitly required, and the sequence of operations may vary. Portions and features of some embodiments may be included in or to substituted for those of others. The scope of the application encompasses the appended claims and all available equivalents. The following description is, therefore, not to be taken in a limited sense, and the scope of the present disclosure is defined by the appended claims.

Also, it is to be understood that the phraseology and terminology used herein is for the purpose of description and should not be regarded as limiting. The use herein of "including," "comprising," or "having" and variations thereof is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings. Further, the terms "a" and "an" herein do not denote a limitation of quantity, but rather denote the presence of at least one of the referenced item.

It will be further understood that each block of the diagrams, and combinations of blocks in the diagrams, respectively, may be implemented by computer program instructions. These computer program instructions may be loaded onto a general purpose computer, special purpose computer, or other programmable data processing apparatus to produce a machine, such that the instructions which execute on the computer or other programmable data processing apparatus may create means for implementing the functionality of each block of the diagrams or combinations of blocks in the diagrams discussed in detail in the description below.

These computer program instructions may also be stored in a non-transitory computer-readable memory that may direct a computer or other programmable data processing apparatus to function in a particular manner, such that the instructions stored in the computer-readable memory produce an article of manufacture including an instruction means that implements the function specified in the block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus implement the functions specified in the block or blocks.

Accordingly, blocks of the diagrams support combinations of means for performing the specified functions, combinations of steps for performing the specified functions and program instruction means for performing the specified functions. It will also be understood that each block of the diagrams, and combinations of blocks in the diagrams, can be implemented by special purpose hardware-based computer systems that perform the specified functions or steps, or combinations of special purpose hardware and computer instructions.

Disclosed are systems and methods for setting an address of a component on power-up or upon reset of a device, such as an imaging device. According to one example embodiment of the present disclosure, a controller may operate in conjunction with a bus master to initiate at least one address change operation on a component upon initialization or reset, such as after installation or at an instance when power is first supplied to the component, in order to change a default address to a different address. In this way, the starting address is kept variable so as to vary the sequence of addresses used by the component at every occurrence of a power-up or reset. In one aspect, the number of address changes may be determined based upon a characterization value associated with a consumable. Consumables used by an imaging device may include, but are not limited to, ink, toner, paper, and staples. Values characterizing a consumable and/or parameters associated with a consumable that are stored within the imaging device may be values that cannot easily be altered by attackers. Thus, it is desirable to allow the number of address changes required upon reset or power-up to be dependent upon such characterization values, parameters and/or usage of the consumable.

Referring now to the drawings, and particularly to FIG. 1, there is shown a block diagram depicting an imaging device 100 used in association with the present disclosure. Imaging device 100 may include a controller 102 communicatively coupled to a print engine 104, and a user interface 106. Controller 102 may include a processor unit (not shown) and associated memory 108. In some example embodiments, controller 102 may be formed as one or more Application Specific Integrated Circuits (ASICs). Memory 108 may be any memory device convenient for use with or capable of communicating with controller 102.

Controller 102 may communicate with print engine 104. Controller 102 may serve to process print data and to operate print engine 104 during printing of an image onto a sheet of media. Print engine 104 may include any of a variety of different types of printing mechanisms including dye-sublimation, dot-matrix, ink-jet or laser printing. Print engine 104 to may include a carriage (not shown) for holding at least one print cartridge or tank 110, which houses ink or toner.

Figure 2:
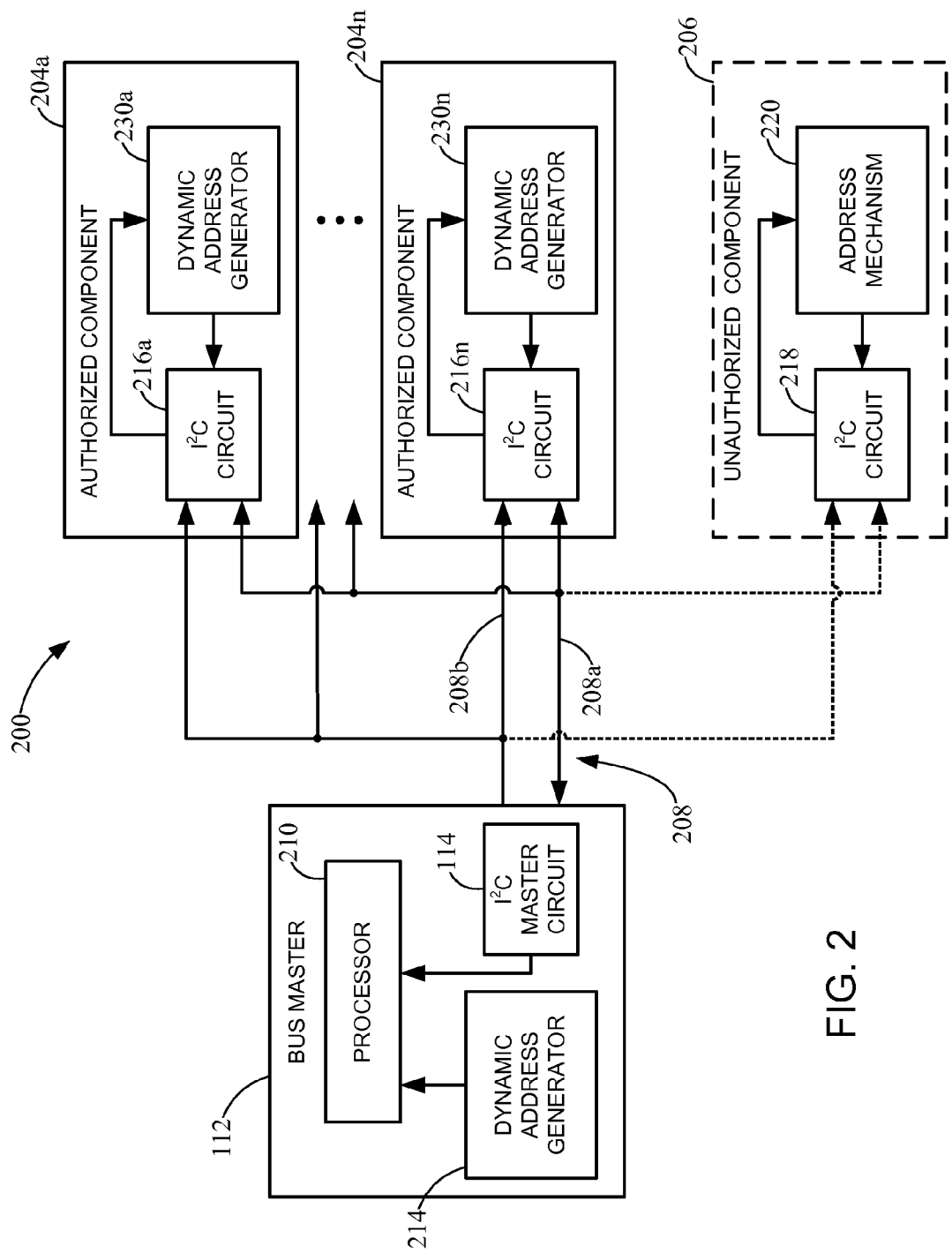
FIG. 2 is a block diagram of a shared data bus system employing a bus master communicating with a plurality of components.

Controller 102 may also be generally configured to control a bus master 112 and may communicate with print cartridge 110 over the shared bus via a master I²C circuit 114. FIG. 2 illustrates one example embodiment of a shared bus system 200. In FIG. 2, bus master 202 may communicate with a number of authorized components 204a-204n on a shared bus 208. In some example embodiments, bus master 112 may communicate with an unauthorized component 206 connected to shared bus 208 in lieu of or in addition to communicating with authorized components 204a-204n.

Shared bus system 200 may utilize the Inter-Integrated Circuit ("I²C") protocol. It will also be appreciated by those of ordinary skill in the art that other bus communication protocols, such as Serial Peripheral Interface Bus (SPI) protocols, System Management Bus (SMB) protocols, UNI/O bus protocols, or other protocols used in bus structures having master/slave configurations may be utilized in some alternative example embodiments.

Bus master 112 may include a processor 210 and master I²C circuit 114 controlled by processor 210. Processor 210 may include a memory for storing instructions, as well as the software algorithm used to predict or determine component addresses.

One wire 208a of shared bus 208 may carry data in a bidirectional manner, and a second wire 208b may carry clock signals from bus master 112 to components 204. While the shared bus 208 is illustrated as a two-wire serial bus in this example embodiment, shared parallel bus structures or other wired structures may be utilized in other example embodiments. In yet other example embodiments, structures that facilitate communication between bus master 112 and components 204 may operate using wireless technology.

Each of components 204a-204n may include an I²C interface circuit 216a-216n for interfacing the I²C protocol commands with bus master 112. Unauthorized component 206 may also be equipped with an I²C interface circuit 218. Each of components 204a-204n may be equipped with a dynamic address generator circuit and/or software 230a-230n for dynamically changing its respective address upon request by bus master 112. Each dynamic address generator 230 may include a pseudorandom address generator that generates addresses according to a predefined algorithm. The pseudorandom address generator may be capable of generating a significant number of addresses, but in a highly irregular and unpredictable manner. When embodied in a circuit form, linear feedback shift registers (LFSRs) may be employed, including the Galios type. In some example embodiments, other LFSRs, such as a Fibonacci type shift register and other pseudorandom types of shift registers, may be employed. The same pseudorandom address generation algorithm used by dynamic address generators 230 in authorized components 204 may be implemented by dynamic address generator 214 in bus master 112.

When authorized component 204 or unauthorized component 206 is installed or replaced, the electrical contacts of the I²C interface circuit 216a-216n or 218 in authorized component 204 or unauthorized component 206 may make contact with the contacts of shared bus 208. To act as a clone or replacement, unauthorized component 206 needs only to be connected to shared bus 208 and use a valid active address that is available in bus system 200.

In order to intercept information on shared bus 208, unauthorized component 206 needs only a simple rudimentary address mechanism 220 in order to be recognized by bus master 112. Address mechanism 220 may be a hardwire design or composed of manual switches. In some example embodiments, address mechanism 220 may be any other apparatus capable of simulating an authorized address.

Shared bus system 200 may be employed in various devices to control various subassemblies and components and obtain status reports thereof. Such components may include, but are not limited to, ink or toner tanks, ink or toner cartridges, carriages, paper advance mechanisms, paper pick mechanisms, and any other addressable components and subassemblies capable of receiving and handling data.

Figure 3:
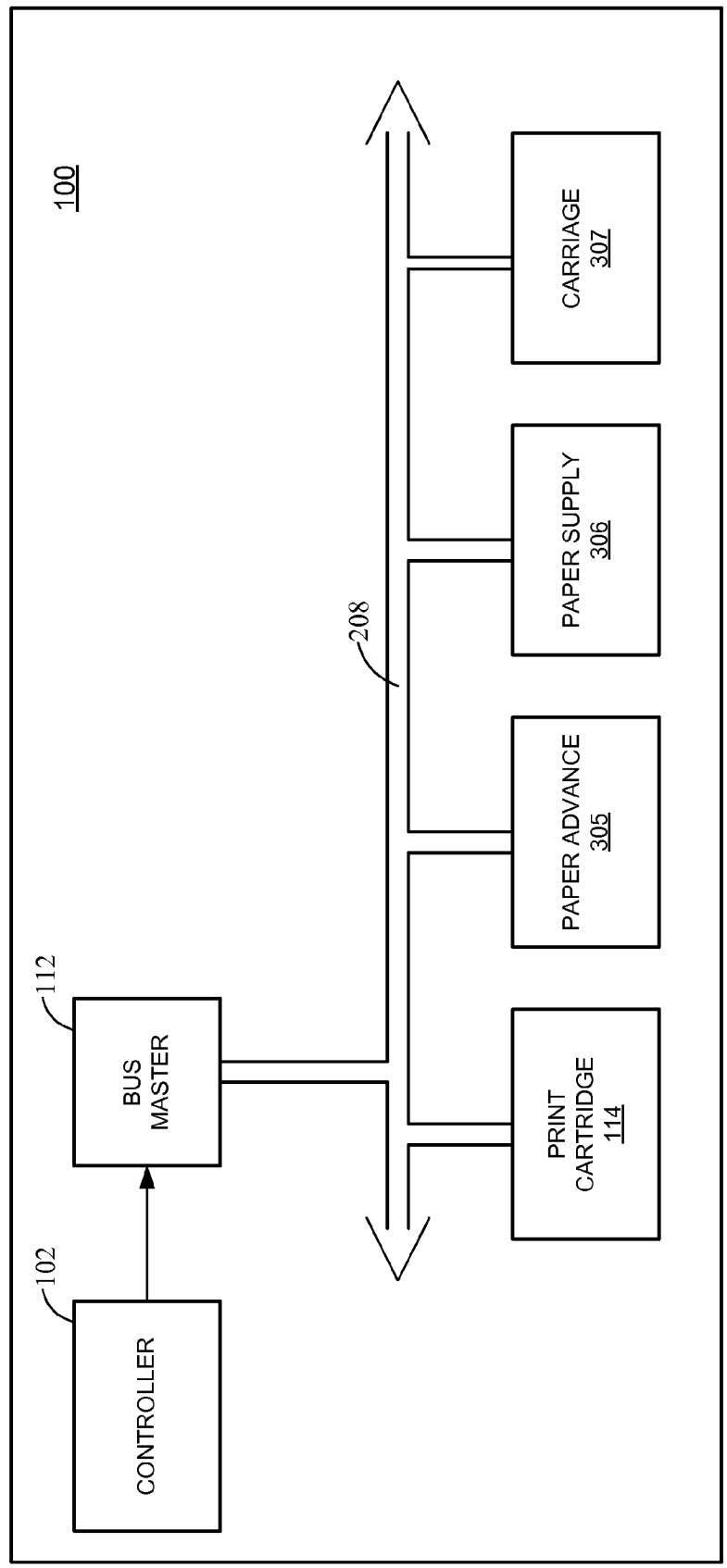
FIG. 3 is a block diagram of the imaging device in FIG. 1 employing the shared data bus system of FIG. 2.

One example embodiment of a device employing shared bus system 200 is imaging device 100. FIG. 3 is a block diagram of imaging device 100 employing shared bus system 200. As seen in FIG. 3, various components, namely print cartridge 110, a paper advance mechanism 305, a paper pick mechanism 306, and a carriage 307 may be connected to shared bus 208. Controller 102 may be generally configured to control bus master 112, and may communicate with master I²C circuit 114 which in turn may communicate with print cartridge 110, paper advance mechanism 305, paper pick mechanism 306, and carriage 307 to over shared bus 208.

Figure 4:
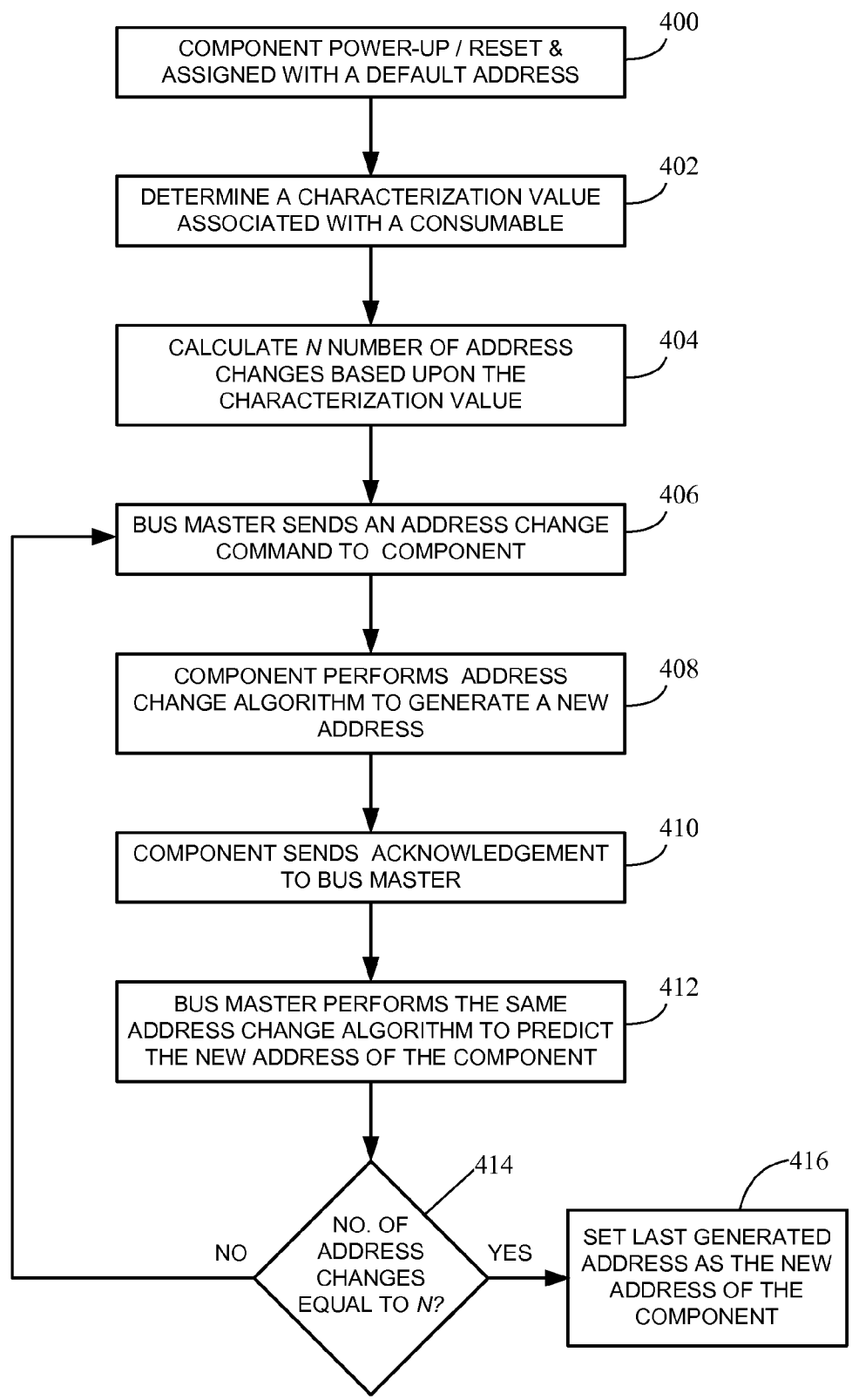
FIG. 4 is a flowchart illustrating one example embodiment of a method of setting an address of a component in the shared bus system of FIG. 2.
Figure 5:
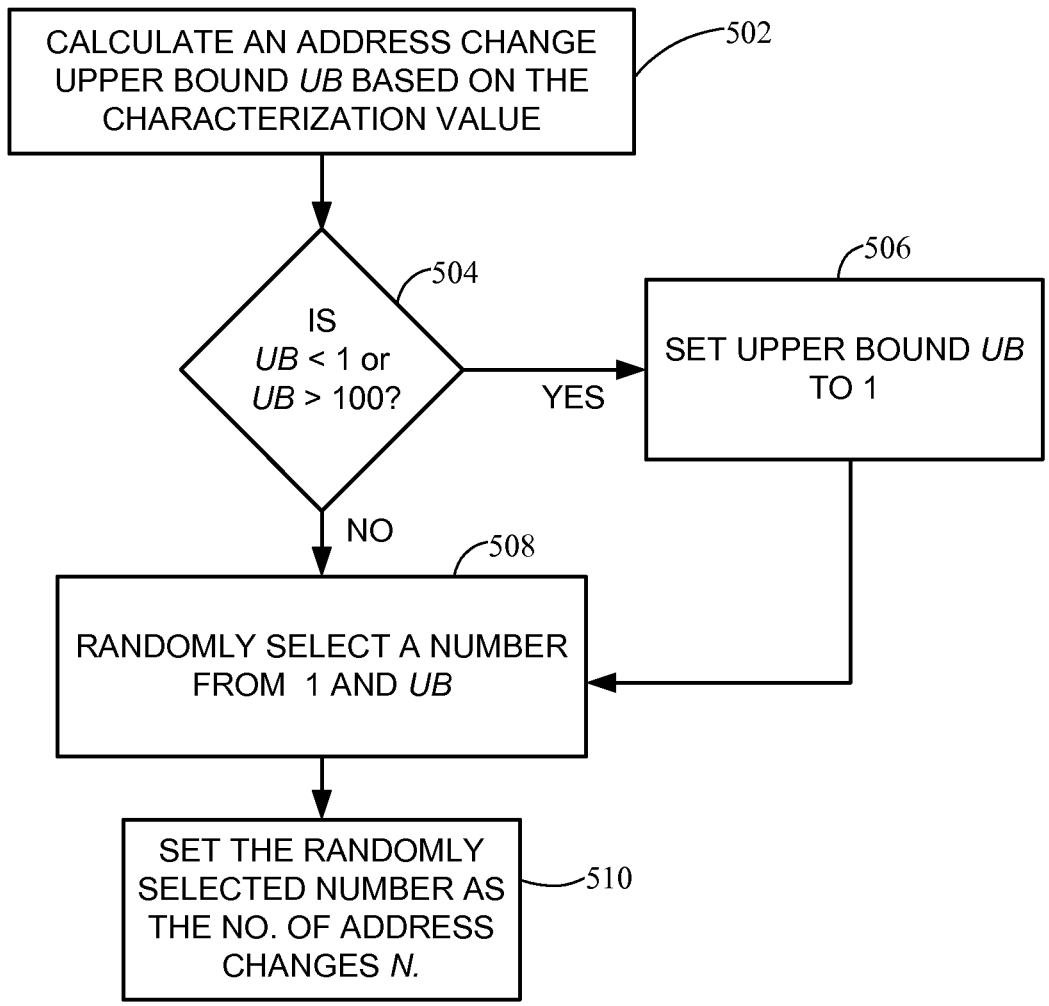
FIG. 5 is a flowchart illustrating one example embodiment of a method of calculating a number of address changes for use in the method of FIG. 4.

FIGS. 4 and 5 show detailed functions carried out in imaging device 100 for changing and/or setting the address of authorized component 204 upon reset. The start of the process is shown in block 400, where authorized component 204 has been reset and assigned with a default address. At block 402, controller 102 determines a characterization value associated with a consumable. A characterization value may be any value that can be used to characterize a consumable, such as values obtained from sensors. Some example measurements and/or readings from sensors may include, but are not limited to, gas gauges, voltages, currents, resistances, and capacitances. The characterization value may also be any parameter derived from sensor measurements including, but not limited to, ink/toner level in a tank, number of ink drops ejected from a printhead, quanta, or normalized page count.

At block 404, a number of address changes may be calculated by controller 102 based upon the characterization value. In one aspect, the number of address changes may be correlated with parameters derived from the characterization value previously determined in block 402, such as an ink level. For example, the ink level may be calculated to fall within a range from 0 to 100 using gas gauge readings from an ink tank. The calculated ink level may then be assigned as the number of address change operations to be performed by authorized component 204. A direct relationship between ink level and the number of address changes may be adapted such that a low ink level may correspond to less address changes and a high ink level may correspond to more address changes upon reset. In some other example embodiments, an inverse relationship between ink level and the number of address changes may be utilized. In still other example embodiments, other parameters associated with other supply items and/or consumables may be utilized.

In another aspect, the number of address changes may be randomly selected from a range of values defined by an address change upper bound instead of being determined by direct correlation with a parameter associated with a consumable. At block 502 of FIG. 5, the address change upper bound may be calculated based upon the characterization value. At block 504, controller 102 determines whether the address change upper bound is less than 1 or greater than 100. In other example embodiments, other test conditions may be utilized to determine whether or not the address change upper bound is outside a predetermined range.

If the determination in decision block 504 is affirmative, the process proceeds to block 506 where the address change upper bound is set to 1. The corrective action in block to 506 keeps the controller from using bad tank values including zero values or values obtained from corrupted measurements. If the decision in block 504 is negative, the process proceeds to block 508.

At block 508, a number from 1 and the address change upper bound may be calculated. To accomplish this, a modulus (MOD) function may use two variables, the address change upper bound and a random number derived from a random number generator, to return an integer remainder having a value from 1 and the calculated address change upper bound. The integer remainder returned by the MOD function may then be assigned as the number of address changes (block 510). The number of address changes is thereby randomly selected from the range of values defined by the address change upper bound. With increased usage of the consumable, the address change upper bound may also change. Accordingly, depending on the configuration, the address change upper bound may either widen or narrow the range of values from which the number of address changes may be randomly selected over the life of the consumable.

Referring back to FIG. 4, bus master 112 may periodically request one or more authorized components 204 to change their addresses (block 406). This request may be transmitted by way of a change address command on shared bus 208. As is conventional with the I²C protocol, bus master 112 may issue commands to authorized components 204 in a format recognizable by authorized components 204. The format by which bus master 112 transmits data on shared bus 208 may include a start bit, the address of the one of authorized components 204 with which bus master wishes to communicate, and a read or write bit. Bus master 112 is in complete control of communications on shared bus 208, and authorized components 204 may only respond to the requests of bus master 112.

When authorized components 204 receive the change address command, authorized components 204 may determine whether the address received from bus master 112 matches the address currently provided by its dynamic address generator 230. If there is an address match, such authorized component (i.e., the addressed authorized component) may decode the change address command using its I²C circuit, and the dynamic address generator corresponding to the addressed authorized component performs or executes its address change algorithm in order to generate a new address (block 408).

Bus master 112 may wait for receipt of an acknowledgement or confirmation from the one of authorized components 204 having the address matching the address transmitted to by bus master 112 (i.e., the addressed authorized component). None of the other authorized components 204 may interrupt communication between bus master 112 and the addressed authorized component until bus master 112 releases the shared bus 208 with a stop bit.

At block 410, authorized component 204 may send an acknowledgment to bus master 112.

At block 412, bus master 112 may perform the same address change algorithm used by the dynamic address generator of the addressed authorized component in order to determine or predict the new address of the addressed authorized component.

At block 414, controller 102 may determine whether or not the number of address change operations performed is equal to the calculated number of address changes. If the determination in block 414 is affirmative, then the last address generated by the series of address change operations is set as the new address of authorized component 204 (block 416). If the determination is negative, the process branches back to block 406, where bus master 112 sends another address change command to the addressed authorized component. Thus, the process flow from block 406 to block 412 may be repeated until the number of address change commands sent by bus master 112 to the addressed authorized component 204 equals the calculated number of address changes.

Both bus master 112 and the addressed authorized component may be updated with the new component address without transmitting the new address on shared bus 208, and all subsequent transmissions by bus master 112 to addressed authorized component may be by way of the newly-assigned address.

As is apparent from the foregoing description, the address change optimization of the present disclosure can be used to further complicate efforts to imitate addresses of authorized components. Controller 102 may be programmed to cause bus master 112 to issue a number of address change commands to the unauthorized component 206 just after installation or power-up. Unauthorized component 206, which may have a fixed series of addresses copied from an authorized component, may not be able to change its address a number of times as requested by bus master 112. As a result, the series of addresses configured in address mechanism 220 of unauthorized component 206 may no longer correspond to the new set addresses required by bus master 112 in order for unauthorized to component 206 to properly access shared bus 208 and communicate with bus master 112.

Unauthorized component 206 may then be detected as a clone, counterfeit or otherwise unauthorized component, and appropriate actions may be taken. For example, the user may be advised to acquire authorized component 204 via a display of user interface 106. Imaging device 100 may be configured to address such a situation to protect against the use of unauthorized components in order to optimize performance of and/or prevent damage to imaging device 100.

Figure 6:
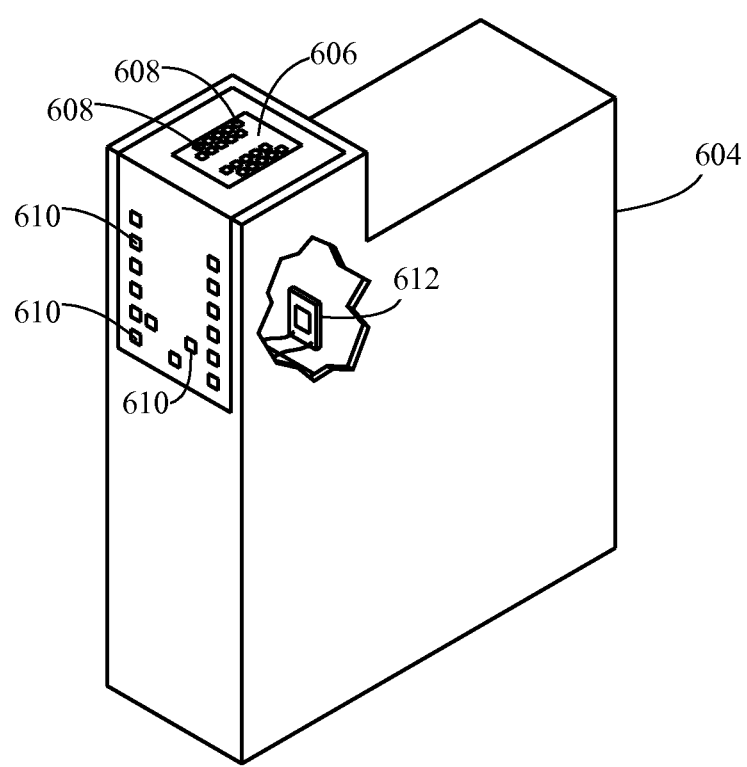
FIG. 6 is an isometric view of an ink cartridge.

FIG. 6 illustrates an ink container or cartridge 602 as an example component which utilizes the dynamic address change optimizations of the present disclosure. Ink cartridge 602 includes a case 604 and a reservoir therein (not shown) for containing liquid ink, generally of a specific color. Ink cartridge 602 includes a printhead 606 with a plurality of nozzles 608 through which droplets of ink are jetted onto a print medium. In addition, ink cartridge 602 includes plural electrical conductor pads 610 for allowing electrical signals to be communicated between a controller 102 and/or a bus master 112 to the circuits of ink cartridge 602. In accordance with the features of the present disclosure, ink cartridge 602 may be equipped with a circuit 612 having an I²C interface for communicating with bus master 112 and a dynamic address generator for dynamically changing the address of cartridge 602 in response to address change commands of bus master 112. As one skilled in the art may recognize, other printer accessories and replacement items may be similarly configured with the dynamic address change optimizations described herein to provide protection against unauthorized replacements.

Relatively apparent advantages of the many embodiments include, but are not limited to, improving security on shared bus systems and preventing unauthorized components from gaining access to a shared bus system. Advantages also introduce notions of using values associated with a consumable to intentionally obfuscate addresses on power-up to make it more difficult for attackers to break or hack the shared bus system. A bus master polls an authorized component equipped with a dynamic address generator on power-up in order to change a default address to a different address so as to vary the sequence of addresses generated by the dynamic address generator after every reset. More importantly, the component does not communicate its new address to the bus master in order to prevent attackers from gaining knowledge of the new address. Rather, the bus master operates the same pseudorandom address generating algorithm used by the component to arrive at the to same address that the component assigned to itself by way of its algorithm. By constantly changing the sequence of addresses based on usage of a consumable and/or in a random manner after a power-up, an unauthorized component programmed to change its address in a fixed manner may be kept from correctly responding to requests or commands issued by the bus master.

Many modifications and other embodiments of the disclosure set forth herein will come to mind to one skilled in the art to which these disclosures pertain having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. Component circuitry, comprising:
an interface for coupling to a master; and
a dynamic address generator coupled to the interface, the dynamic address generator selectively generating component addresses, wherein substantially immediately following an event, the component circuitry performs in succession a plurality of sets of operations, each set of operations comprising receiving, by the interface, an address change request from the master and generating a new component address by the dynamic address generator in response, a last one of the new component addresses generated being available as the component address for the component circuitry in one or more subsequent communications with the master, the event comprising at least one of the component circuitry being coupled to the master, the component circuitry initially receiving power and the component circuitry being reset.

2. The component circuitry of claim 1, wherein each set of operations further comprises sending at least one acknowledgement to the master by the interface.

3. The component circuitry of claim 1, wherein the component circuitry is connectable to a tank containing toner or ink.

4. The component circuitry of claim 1, wherein the component circuitry performs in immediate succession the plurality of sets of operations substantially immediately following the event.

5. The component circuitry of claim 1, wherein the component circuitry performs in succession the plurality of sets of operations substantially immediately following each occurrence of the event.

6. The component circuitry of claim 1, wherein a number of the plurality of sets of operations is based on an ink or toner level within a component to which the component circuitry is associated.

7. The component circuitry of claim 6, wherein the number of the plurality of sets of operations is a number between a value corresponding to the ink or toner level and a predetermined number.

8. The component circuitry of claim 1, wherein the component circuitry is connected to a tank containing toner or ink.

9. A consumable device, comprising:
a reservoir containing toner or ink; and
circuitry, comprising an interface for coupling to a master and a dynamic address generator coupled to the interface, the dynamic address generator for generating component addresses, wherein following an event, the circuitry performs in succession a plurality of sets of operations, each set of operations comprising receiving, by the interface, an address change request from the master and generating a new component address by the dynamic address generator in response, wherein a last one of the new component addresses generated is available as the component address for the circuitry in one or more subsequent communications to with the master, the event comprising at least one of the circuitry being coupled to the master, the circuitry initially receiving power and the circuitry being reset.

10. The consumable device of claim 9, wherein each set of operations further comprises sending at least one acknowledgement to the master by the interface.

11. The consumable device of claim 9, wherein the circuitry performs in succession the plurality of sets of operations substantially immediately following the event.

12. The consumable device of claim 9, wherein the circuitry performs in succession the plurality of sets of operations substantially immediately following each occurrence of the event.

13. The consumable device of claim 9, wherein a number of the plurality of sets of operations is based on a toner or ink level within the reservoir.

14. The consumable device of claim 13, wherein number of the plurality of sets of operations is a number between a value corresponding to the toner or ink level and a predetermined number.

15. Component circuitry, comprising:
an interface circuit for communicatively coupling with a master; and
a dynamic address generator coupled to the interface circuit, the dynamic address generator selectively generating component addresses, wherein substantially immediately following an event, the interface circuit receives a plurality of address change requests from the master and, in response to each address change request received, the dynamic address generator generates a new component address and the interface circuit sends to the master at least one acknowledgement, each acknowledgement being sent before a next address change request of the plurality of address change requests is received by the interface circuit, a last one of the new component addresses generated being available by the component circuitry for one or more subsequent communications with the master, the event comprising at least one of the component circuitry being coupled to the master, the component circuitry initially receiving power and the component circuitry being reset.

16. The component circuitry of claim 15, wherein the interface circuit receives the plurality of address change requests in succession.

17. The component circuitry of claim 15, wherein the interface circuit receives the plurality of address change requests substantially immediately following each occurrence of the event.

18. The component circuitry of claim 15, wherein the component circuitry is connectable to a tank containing toner or ink.

19. The component circuitry of claim 15, wherein a number of the address change requests is based on an ink or toner level within a component to which the component circuitry is associated.

20. The component circuitry of claim 19, wherein the number of the plurality of sets of operations is a number between a value corresponding to the ink or toner level and a predetermined number.

21. The component circuitry of claim 15, wherein the interface circuit receives the plurality of address change request immediate succession.

\* \* \* \* \*